US012623927B2

(12) United States Patent
Xu et al.

(10) Patent No.: US 12,623,927 B2
(45) Date of Patent: May 12, 2026

(54) FUNCTIONALIZED LAYERED DOUBLE HYDROXIDES FOR TREATMENT OF CONTAMINATED WATER

(71) Applicant: UWM Research Foundation, Inc., Milwaukee, WI (US)

(72) Inventors: Shangping Xu, Mequon, WI (US); Yin Wang, Whitefish Bay, WI (US); Jingwan Huo, Shorewood, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 504 days.

(21) Appl. No.: 18/215,966

(22) Filed: Jun. 29, 2023

(65) Prior Publication Data

US 2024/0002262 A1     Jan. 4, 2024

Related U.S. Application Data

(60) Provisional application No. 63/356,677, filed on Jun. 29, 2022.

(51) Int. Cl.
| | |
|---|---|
| *C02F 1/28* | (2023.01) |
| *B01J 20/02* | (2006.01) |
| *B01J 20/08* | (2006.01) |
| *B01J 20/22* | (2006.01) |
| *B01J 20/32* | (2006.01) |
| *C02F 101/36* | (2006.01) |
| *C02F 103/00* | (2006.01) |

(52) U.S. Cl.
CPC .......... *C02F 1/288* (2013.01); *B01J 20/0244* (2013.01); *B01J 20/0248* (2013.01); *B01J 20/0296* (2013.01); *B01J 20/08* (2013.01); *B01J 20/223* (2013.01); *B01J 20/3204* (2013.01); *B01J 20/3219* (2013.01); *B01J 20/3257* (2013.01); *C02F 1/281* (2013.01); *C02F 1/285* (2013.01); *C02F 2101/36* (2013.01); *C02F 2103/007* (2013.01)

(58) Field of Classification Search
None
See application file for complete search history.

(56) References Cited

U.S. PATENT DOCUMENTS

| | | | | |
|---|---|---|---|---|
| 2009/0305885 A1* | 12/2009 | Yamada | .............. | B01J 20/0222 502/414 |
| 2019/0270891 A1* | 9/2019 | O'Hare | .................... | C08K 3/26 |

* cited by examiner

*Primary Examiner* — Jonathan M Peo
(74) *Attorney, Agent, or Firm* — Secant IP PLLC

(57) ABSTRACT

The present invention is directed at functionalized layered double hydroxides, including methods of their preparation, that are suitable for treatment of water contaminated with per- and polyfluoroalkyl substances.

24 Claims, 10 Drawing Sheets

0

1

FUNCTIONALIZED LAYERED DOUBLE HYDROXIDES FOR TREATMENT OF CONTAMINATED WATER

CROSS-REFERENCE TO PRIOR APPLICATION

This application claims priority to and the benefit of U.S. Provisional Application No. 63/356,677 filed Jun. 29, 2022 the entirety of which is incorporated by reference.

GOVERNMENT SUPPORT CLAUSE

This invention was made with government support under grant 1540032 awarded by the National Science Foundation. The government has certain rights in the invention.

FIELD

The present invention is directed at functionalized layered double hydroxides and methods of their preparation that are suitable for treatment of water contaminated with per- and polyfluoroalkyl substances.

Background

Per- and polyfluoroalkyl substances (PFAS) represent a class of synthetic chemicals containing a hydrophobic fluorinated carbon chain and various types of hydrophilic end/head functional groups such as alcohol, carboxylate, sulfonamide, sulfonate, and phosphonate. Because of their unique amphiphilic properties as well as their high chemical and thermal stability, PFAS have been used since the 1940s in a wide range of consumer, commercial, and industrial applications such as electronic manufacturing, industrial surfactants, paper and textile water proofing, metal plating and etching, surface treatment and protection, and firefighting foams. Many PFAS, such as perfluoroalkyl acids (PFAAs) and perfluoropolyether carboxylic acids (PFECAs), are remarkably persistent in nature, negatively charged under ambient pH conditions, and highly soluble in aquatic environment. Perfluorooctane sulfonate (PFOS) and perfluorooctanoic acid (PFOA) are the two most examined PFAS within both scientific and regulation communities, and they have been detected in soil, groundwater and surface water. PFOS, PFOA, as well as their precursors, are currently listed under the Stockholm Convention on Persistent Organic Pollutants. The United States Environmental Protection Agency (USEPA) has proposed the National Drinking Water Regulation for six PFAS including PFOS and PFOA. The USEPA's fifth Unregulated Contaminant Monitoring Rule (UCMR5) further required the public water systems in the United States to monitor 29 PFAS between 2023 and 2025.

Layered double hydroxides (LDHs), also known as anionic clays, are a family of layered minerals with a typical formula of $[M^{2+}_{1-x}N^{3+}_x(OH)_2]^{x+}(A^{n-})^{x/n}\cdot mH_2O$. The $M^{2+}$ and $N^{3+}$ are metal cations occupying the octahedral centers of the positively charged brucite-like structural layers, and $A^{n-}$ is an exchangeable anion within the interlayers. Because of the high positive charge of the structural layer, LDHs generally exhibit positive surface charges over a range of environmentally relevant pH conditions, making them suitable for the adsorptive removal of anionic pollutants. However, LDHs are generally hydrophilic and the electrostatic interactions between LDHs and PFAS were considered the primary adsorption mechanism.

Accordingly, a need remains to provide new and relatively more efficient LDHs to enhance their affinity with targeted PFAS compounds present in the environment and to provide a relatively more efficient LDH for treatment of water contaminated with PFAS substances.

SUMMARY

A functionalized layered double hydroxide having the following formula:

$$3[M^{2+}_{1-x}N^{3+}_x(OH)(A^{n-})_{x/n}\text{-}O]\text{—}Si(CH_2)_a\text{—}(CF_2)_bR'$$

wherein $M^{2+}$ and $N^{3+}$ are metal cations;
$A^{n-}$ is an exchangeable anion, n is an integer of 1 or greater;
$0 < x < 1$;
R' represents an aromatic, $CH_2\!\!=\!\!CH\text{—}$, $\text{—}CH_3$ or $\text{—}CF_3$ group;
if $b=0$, then $a \geq 5$; and
if $b > 0$, then $a \geq 0$.

A method of preparation of a functionalized layered double hydroxide comprising:

a. supplying an organofunctional silicon having the following formula:

$$R'(CF_2)_b(CH_2)_aSi(OR)_3$$

wherein R' represents an aromatic, $CH_2\!\!=\!\!CH\text{—}$, $\text{—}CH_3$ or $\text{—}CF_3$ group and (OR) represents an alkoxy group;
if $b=0$, then $a \geq 5$ or if $b > 0$ then $a \geq 0$;

b. supplying a layered double hydroxide having the following formula:

$$[M^{2+}_{1-x}N^{3+}_x(OH_2)]^{x+}(A^{n-})_{x/n}$$

wherein $M^{2+}$ and $N^{3+}$ are metal cations and $A^{n-}$ is an exchangeable anion, n is an integer of 1 or greater, $0 < x < 1$;

c. combining said organofunctional silicon with said layered double hydroxide and forming a functionalized layered double hydroxide having the following formula:

$$3[M^{2+}_{1-x}N^{3+}_x(OH)(A^{n-})_{x/n}\text{-}O]\text{—}Si(CH_2)_a\text{—}(CF_2)_bR'$$

wherein $M^{2+}$ and $N^{3+}$ are metal cations;
$A_{n-}$ is an exchangeable anion, n is an integer of 1 or greater;
$0 < x < 1$;
R' represents an aromatic, $CH_2\!\!=\!\!CH\text{—}$, $\text{—}CH_3$ or $\text{—}CF_3$ group;
if $b=0$, then $a \geq 5$; and
if $b > 0$, then $a \geq 0$.

A method of removing per- and polyfluoroalkyl substances from contaminated water comprising:

a. supplying a functionalized layered double hydroxide having the following formulae:

$$3[M^{2+}_{1-x}N^{3+}_x(OH)(A^{n-})_{x/n}\text{-}O]\text{—}Si(CH_2)_a\text{—}(CF_2)_bR'$$

wherein $M^{2+}$ and $N^{3+}$ are metal cations;
$A^{n-}$ is an exchangeable anion, n is an integer of 1 or greater;
$0 < x < 1$;
R' represents an aromatic, $CH_2\!\!=\!\!CH\text{—}$, $\text{—}CH_3$ or $\text{—}CF_3$ group;
if $b=0$, then $a \geq 5$;
if $b > 0$, then $a \geq 0$;

b. treating water with said contaminated water with said functionalized layered double hydroxide and removing said per- and polyfluoroalkyl substances.

DESCRIPTION OF THE PREFERRED EMBODIMENTS

Figure 1A:
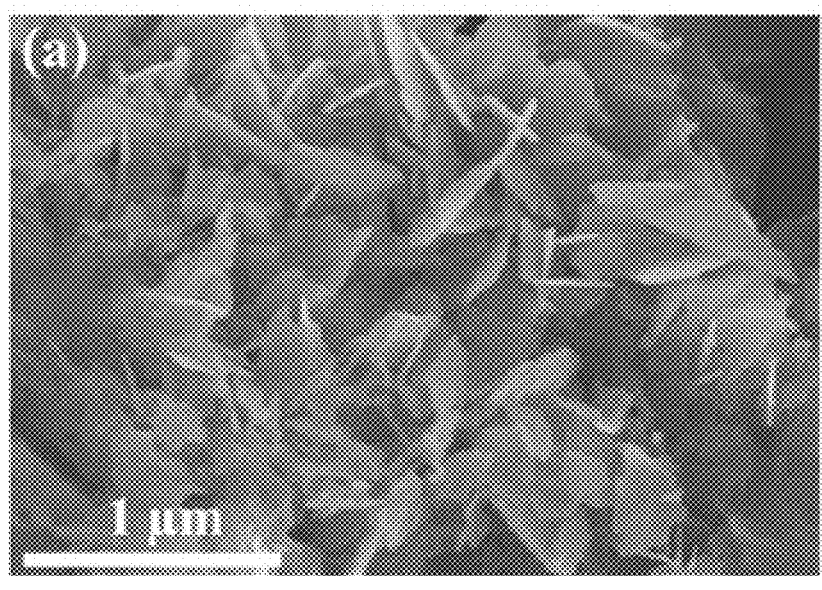
FIG. 1A shows an SEM image of the Zn—Al LDH prior to functionalization.

The present invention stands directed at functionalized layered double hydroxides (LDHs) that are suitable for treatment of water contaminated with per- and polyfluoroalkyl substances. Per- and polyfluoroalkyl substances (PFAS) are understood herein as a class of synthetic chemicals containing a hydrophobic fluorinated carbon chain and various types of hydrophilic end/head functional groups, such as alcohol, carboxylate, sulfonamide, sulfonate, and phosphonate.

The layered double hydroxides that are suitable for functionalization for treatment of contaminated water preferably comprise the following:

$$[M^{2+}_{1-x}N^{3+}_x(OH_2)]^{x+}(A^{n-})_{x/n} \cdot zH_2O$$

where $M^{2+}$ and $N^{3+}$ are metal cations and $A^{n-}$ is an exchangeable anion, n is an integer of 1 or greater, $0 < x < 1$, and z is 0 or greater. In the above formula, $M^{2+}$ can be any divalent cation, but examples thereof preferably include $Mg^{2+}$, $Ca^{2+}$, $Zn^{2+}$, $Mn^{2+}$, or $Fe^{2+}$ and more preferably $Zn^{2+}$. $M^{3+}$ can be any trivalent cation, but examples thereof preferably include $Al^{3+}$ or $Fe^{3+}$ and more preferably $Al^{3+}$. $A^{n-}$ can be any anion, however, preferred examples thereof include $NO_3^-$ or $Cl^-$. Therefore, in the above formula, $M^{2+}$ preferably contains $Zn^{2+}$, $M^{3+}$ preferably contains $Al^{3+}$, and $A^{n-}$ preferably contains $NO_3^-$ or $Cl^-$, n is an integer of 1 or greater, but preferably 1 or 2, $0 < x < 1$ and z is an arbitrary numeral denoting the number of water molecules.

The LDHs noted above are then treated with organofunctional silicon to provide the functionalized LDHs compounds. The general molecular structure of the organofunctional silanes used herein can be represented as:

$$R'(CF_2)_b(CH_2)_aSi(OR)_3$$

where R' represents an aromatic, $CH_2 = CH —$, $—CH_3$ or $—CF_3$ group, (OR) represents an alkoxy group such as ethoxy $(OC_2H_5)$, methoxy $(OCH_3)$, hydroxyl (OH), or acetoxy $(OCOCH_3)$. In addition, if b=0, then a≥5 (e.g., a=5-19). In addition, if b>0 (e.g., b=1-11), then a≥0, more preferably a=0-15. In one particularly preferred embodiment, R is an ethoxy group, R' is $—CH_3$, b is zero and a is 7, otherwise known as triethoxy(octyl)silane. In another particularly preferred embodiment, R is an ethoxy group, R' is $—CF_3$, a=2 and b is 5, otherwise known as 1H, 1H, 2H, 2H-perfluorooctyltriethoxysilane.

Accordingly, to illustrate the reaction of the LDHs with the organofunctional silane herein, one can employ as the preferred organofunctional silicon $CF_3(CF_2)_5(CH_2)_2Si$ $(OCH_2CH_3)_3$ and the LDH is preferably $Zn_{1-x}Al_x(OH)_2$ $(NO_3)_x$ and the reaction proceeds as follows showing the functionalization of the —OH groups on the LDH:

$$3Zn_{1-x}Al_x(OH)_2(NO_3)_x + CF_3(CF_2)_5(CH_2)_2Si$$
$$(OCH_2CH_3)_3 \rightarrow 3(Zn_{1-x}Al_x(OH)(NO_3)_xO) —Si$$
$$(CH_2)_2(CF_2)_5CF_3[LDH-CF] + 3\ CH_3CH_2OH$$

Similarly, in the case of the preferred use of triethoxy (octyl)silane, the functionalization of the LDH may proceed as follows:

$$3Zn_{1-x}Al_x(OH)_2(NO_3)_x + CH_3(CH_2)_7Si(OCH_2$$
$$CH_3)_3 \rightarrow 3(Zn_{1-x}Al_x(OH)(NO_3)_xO) —Si$$
$$(CH_2)_7CH_3(CH_2)_7CH_3[LDH-C8] + 3CH_3CH_2OH$$

Accordingly, it can now be appreciated that the organo-functionalized LDHs herein may be represented by the following formula:

$$3[M^{2+}_{1-x}N^{3+}_x(OH)(A^{n-})_{x/n}\text{-}O] —Si(CH_2)_n —(CF_2)_bR'$$

wherein as noted above, $M^{2+}$ and $N^{3+}$ are metal cations and $A^{n-}$ is an exchangeable anion, n is an integer of 1 or greater, $0 < x < 1$. In the above formula, $M^{2+}$ can again be any divalent cation, but examples thereof again preferably include $Mg^{2+}$, $Ca^{2+}$, $Zn^{2+}$, $Mn^{2+}$, or $Fe^{2+}$ and more preferably $Zn^{2+}$. $M^{3+}$ can be any trivalent cation, but examples thereof again preferably include $Al^{3+}$ or $Fe^{3+}$ and more preferably $Al^{3+}$. $A^{n-}$ can be any anion, however, preferred examples again include $NO_3^-$ or $Cl^-$. Therefore, in the above compositional formula, $M^{2+}$ preferably contains $Zn^{2+}$, $M^{3+}$ preferably contains $Al^{3+}$, and $A^{n-}$ preferably contains $NO_3^-$ or $Cl^-$, n is an integer of 1 or greater, but preferably 1 or 2, $0 < x < 1$. R' represents an aromatic, $CH_2 = CH —$, $—CH_3$ or $—CF_3$ group, and if b=0, then a≥5 (e.g., a=5-19). In addition, if b>0 (e.g., b=1-11), then a≥0, more preferably a=0-15. Two particularly preferred LDHs herein therefore are ones wherein: (1) M=Zn, N=Al, A is $NO_3^-$, a=7, b=0 and R' is $—CH_3$, identified herein as LDH-C8; (2) M=Zn, N=Al, A is $NO_3^-$, a=2, b=5 and R' is $—CF_3$, identified herein as LDH-CF.

Figure 1B:
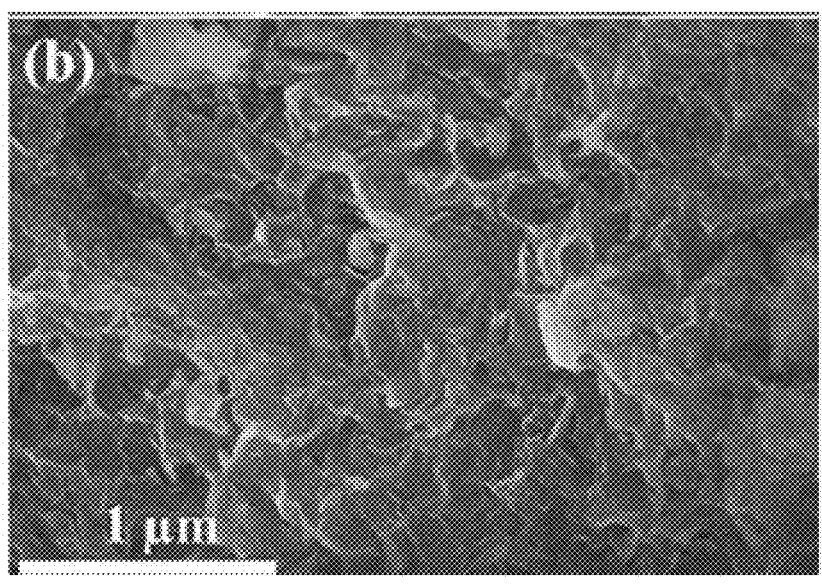
FIG. 1B shows the SEM image of LDH-C8.
Figure 1C:
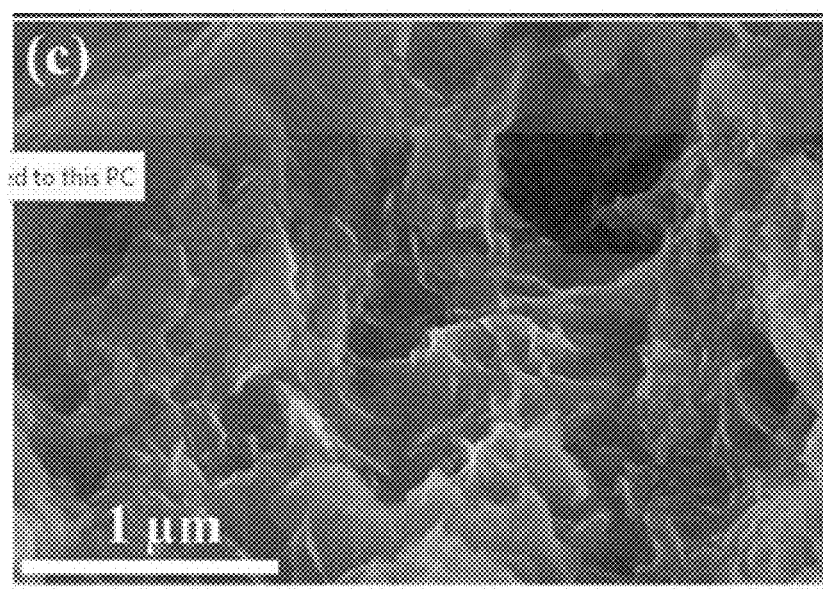
FIG. 1C shows the SEM image of LDH-CF.

As therefore may now be appreciated, in preferred embodiment, a Zn—Al LDH was modified with organic functional groups through a grafting process to prepare the functionalized LDHs. FIG. 1A shows the SEM image of Zn—Al LDH prior to functionalization. FIG. 1B shows the SEM image of LDH-C8 and FIG. 1C shows the SEM image of LDH-CF produced herein. Based on the SEM images, the unmodified LDH consisted of clutters of randomly stacked small thin flakes with relatively clear and sharp edges. After modification, the edges of the LDH thin flakes became smoother, probably due to the coverage of the organic functional groups onto the surface of the functionalized.

Figure 2A:
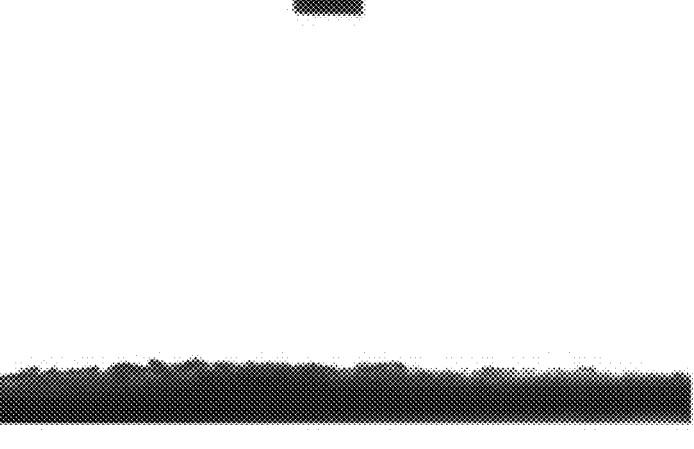
FIG. 2A shows the unmodified LDH with a contact angle in water of close to 0°.
Figure 2B:
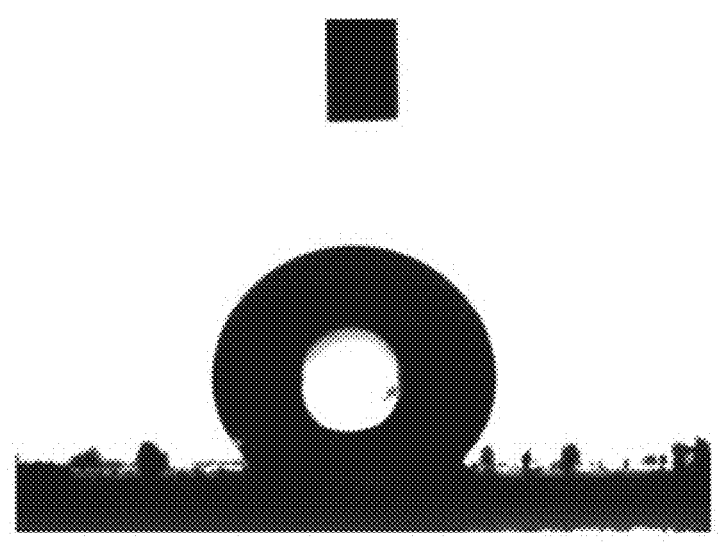
FIG. 2B shows the contact angle in water of LDH-C8.
Figure 2C:
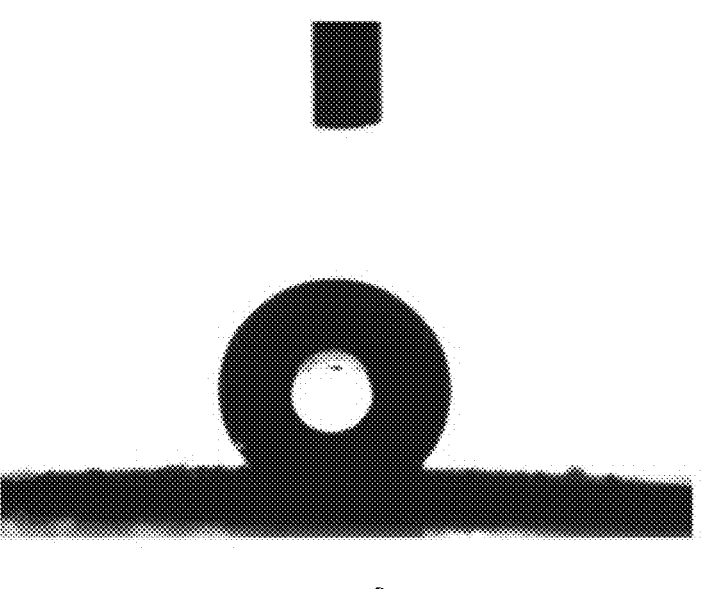
FIG. 2C shows the contact angle in water of LDH-CF.

The contact angle analysis clearly suggested that modification with organic functional groups increased the hydrophobicity of LDHs. As illustrated in FIGS. 2A, 2B and 2C, the unmodified LDH was relatively hydrophilic in nature with a contact angle of water close to 0° (FIG. 2A). In contrast, the surfaces of LDH-C8 and LDH-CF became relatively hydrophobic with the water contact angles increasing to 136.6° and 133.3°, respectively. See FIGS. 2B and 2C.

Figure 3:
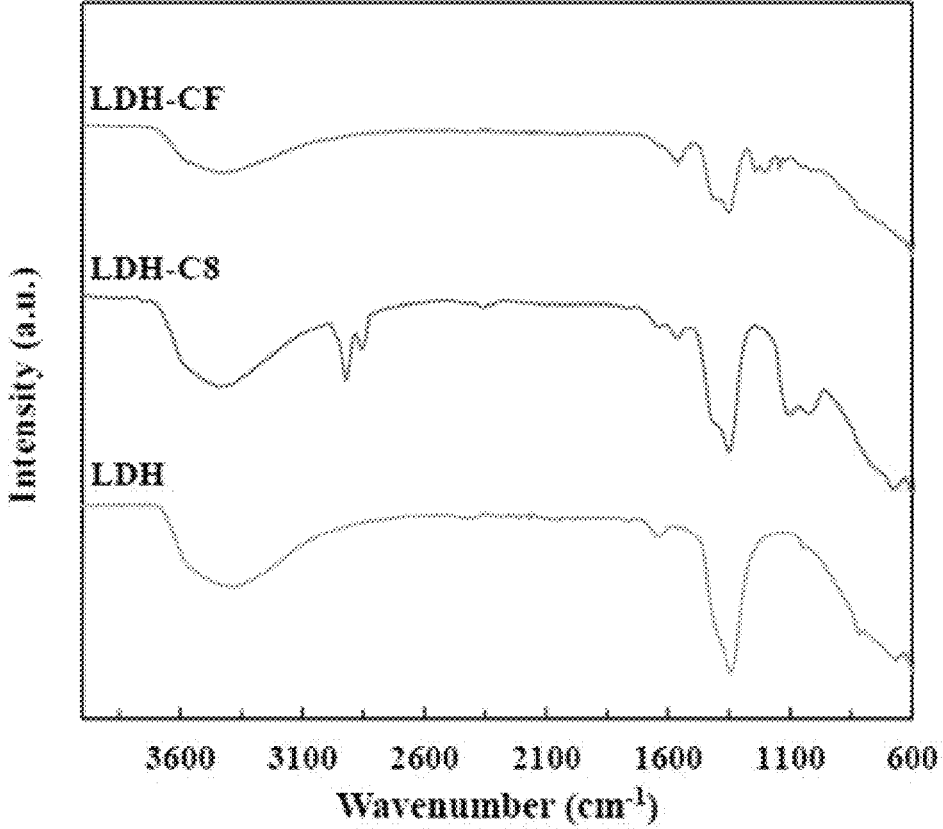
FIG. 3 shows FTIR analysis of the identified layered double hydroxides.

FTIR was employed to determine the functional groups of the unmodified Zn—Al LDH, LDH-C8, and LDH-CF. See FIG. 3. All three materials showed a broad absorption peak at 3600-3200 $cm^{-1}$, which was ascribed to the hydroxyl groups within the LDH structure. Additionally, the peaks centered at ~1350 cm$^{-1}$ and ~1635 cm$^{-1}$ were assigned to the interlayer nitrate ions and adsorbed H$_2$O, respectively. Compared to the pristine LDH, the FTIR spectrum of LDH-C8 showed two new characteristic peaks at 2850-2940 cm$^{-1}$, which were attributed to the symmetric stretching and asymmetric mode of C—H of the alkyl groups. For LDH-CF, the new peaks centered at ~1135, and 1205 cm$^{-1}$ were related to the vibrations of the —CF$_3$ and —CF$_2$— of the polyfluoroalkyl groups. Interestingly, the peaks associated with C—H stretching were not clearly shown for LDH-CF in comparison to LDH-C8, which may be related to the small number of C—H bonds within the polyfluoroalkyl group, as well as the lower functional group molar loading of LDH-CF than LDH-C8. Additionally, the peak at ~1015 cm$^{-1}$ for both LDH-C8 and LDH-CF was assigned to the stretching vibration of Si—O, and it was stronger for LDH-C8 than LDH-CF, probably because of the higher functional group molar loading within LDH-C8. The FTIR results thus suggested that the alkyl and polyfluoroalkyl groups were incorporated into LDH-C8 and LDH-CF, respectively.

According to the carbon elemental analysis, the loadings of the alkyl and polyfluoroalkyl groups were 1.55 and 0.57 mmol/g for LDH-C8 and LDH-CF, respectively. It should be noted that the functional group loading for LDH-CF was estimated based on the assumption of complete combustion of the polyfluoroalkyl groups within the NCS elemental analyzer operated at 980° C. with excessive oxygen.

Figure 4:
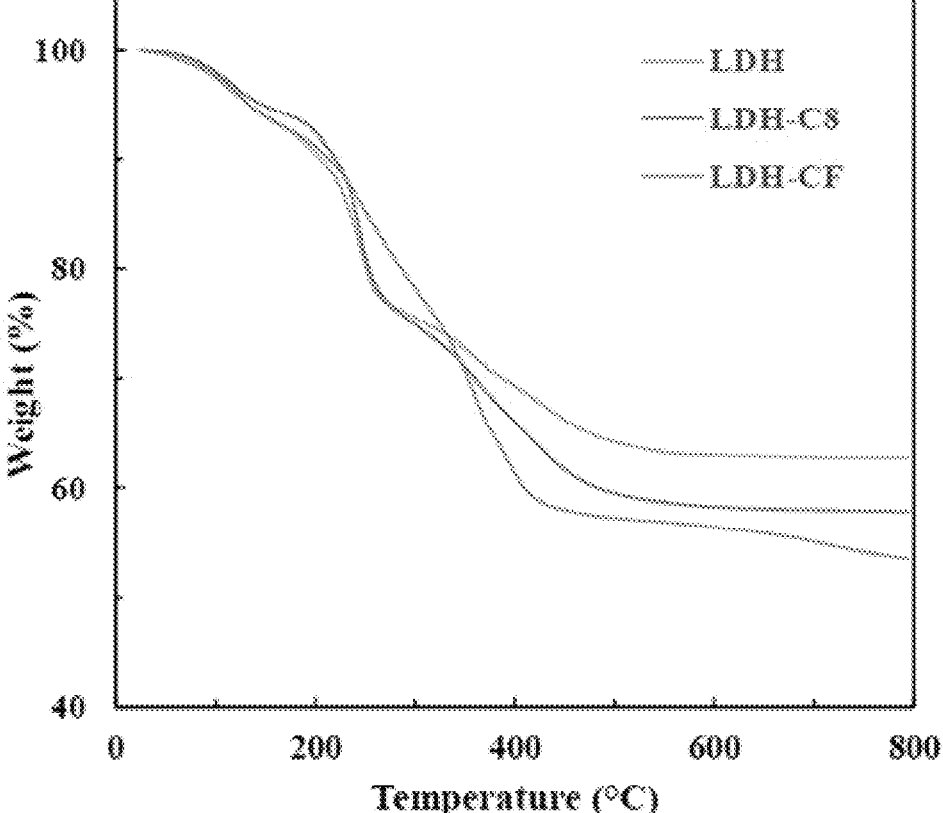
FIG. 4 shows weight loss versus temperature of the identified layered double hydroxides.

The thermostability of the functionalized LDHs herein was further investigated using TGA analysis. See FIG. 4. For all three materials, the gradual weight loss at up to −200° C. indicated the removal of adsorbed water, which would not affect the structural integrity of the functionalized LDHs. The weight loss at higher temperature may be related to the decomposition of the nitrate anions within the interlayer, the degradation of the organic functional groups of LDH-CF and LDH-C8, and the dihydroxylation of the LDH structural layers. The weight loss of the unmodified LDH and LDH-C8 became minimal above ~500° C., indicating the formation of stable end products such as (mixed) metal oxides. In contrast, a slight weight loss was observed for LDH-CF till 800° C., which may be related to the complex thermal decomposition processes of polyfluoroalkyl groups. Compared to the unmodified LDH, higher weight losses were observed for LDH-CF and LDH-C8 at 800° C., which were consistent with the high organic functional loadings for these two functionalized LDHs. Notably, because of the higher molecular weight of the polyfluoroalkyl group (i.e., —(CH$_2$)$_2$(CF$_2$)$_5$CF$_3$) within LDH-CF than the alkyl group (i.e., —(CH$_2$)$_7$CH$_3$) within LDH-C8, LDH-CF would have a higher mass loading of the functional groups than that of LDH-C8, resulting in a slightly higher weight loss in the TGA profile.

Figure 5:
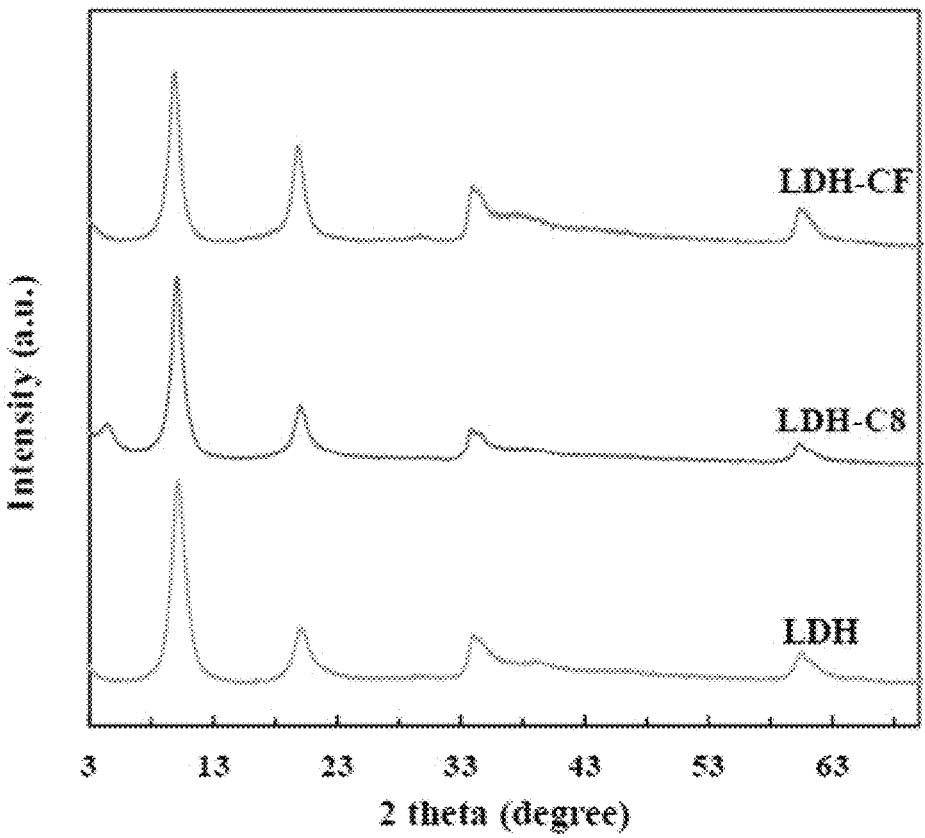
FIG. 5 shows XRD analysis of the identified layered double hydroxides.

The crystalline structure of the LDHs prior to and after organics modification was compared using XRD. See FIG. 5. For the unmodified LDH, a characteristic peak at 2θ of 10.2° was clearly observed, which represented the (003)

reflection and confirmed the layered structure of the material. According to the Bragg equation, the basal spacing (d003) of the unmodified LDH was 0.87 nm. Compared to the unmodified LDH, the (003) peak position of LDH-CF did not change, suggesting that the layered structure was retained with minimal change of the basal spacing after modification with polyfluoroalkyl groups. In contrast, in addition to the strong peak at 2θ of 10.2°, a small peak at 2θ of 4.4° appeared for LDH-C8, which indicated the formation of a new minor phase after modification with alkyl groups. The basal spacing corresponding to this new minor peak was calculated as 2.01 nm, suggesting a partial interlayer expansion for LDH-C8.

Figure 6:
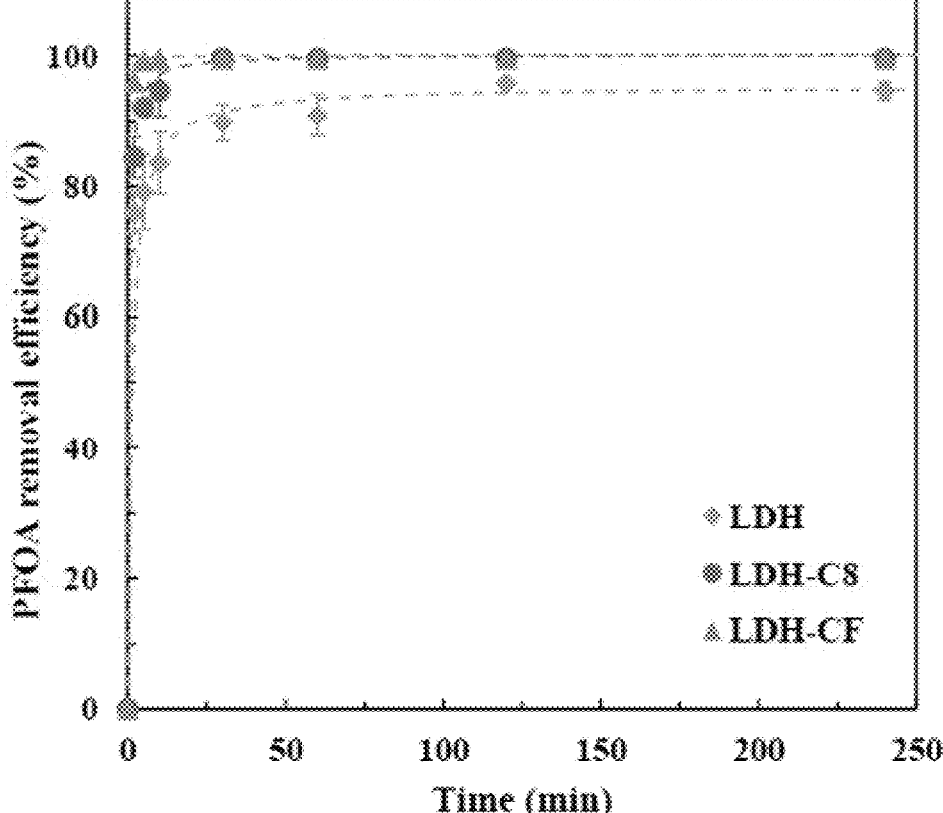
FIG. 6 shows PFOA removal efficiency of the identified layered double hydroxides.

Adsorption kinetics and isotherm studies were first performed to investigate the adsorption behavior of PFOA onto the pristine (non-functionalized) and organically functionalized LDHs herein. Based on the kinetics experiments, all materials exhibited a relatively rapid initial PFOA uptake, and then a gradually slower stage until adsorption reached equilibrium. See FIG. 6. For the unmodified Zn—Al LDH, the equilibrium state was achieved within 2 h. Meanwhile, the organically functionalized LDHs herein exhibited relatively faster adsorption kinetics and more complete PFOA removal than the unmodified LDH. Specifically, PFOA adsorption reached equilibrium within 5 minutes and 30 minutes under the experimental condition for LDH-CF and LDH-C8, respectively. The observed relatively faster adsorption kinetics of the organically functionalized LDHs than the pristine LDH suggested that modification with organic functional groups created more favorable conditions for PFOA adsorption. Overall, the kinetic results suggested that modification of LDHs with the organic functional groups herein substantially accelerated PFOA adsorption.

Adsorption isotherms of PFOA onto the pristine and organically functionalized LDHs were obtained to determine the adsorption capacities and affinity. The data was fitted with the classic Langmuir (Eq. 1) and Freundlich (Eq. 2) models:

$$Q_e = \frac{Q_{max}K_LC_e}{1 + K_LC_e} \tag{1}$$

$$Q_e = K_FC_e^{1/n} \tag{2}$$

where C$_e$ (mg/L) is the equilibrium PFOA concentration in the solution, Q$_e$ (mg/g) is the amount of PFOA adsorbed onto the (functionalized) LDHs at equilibrium, Q$_{max}$ (mg/g) and K$_L$ (L/mg) represent the maximum adsorption capacity and the Langmuir constant related to the energy of adsorption, respectively, and K$_F$ ((mg/g) (L/mg)$^{1/n}$) and n are the Freundlich constant and a dimensionless indicator related to the adsorption heterogeneity, respectively.

Based on the R$^2$ values, the Langmuir model fitted the adsorption data slightly better than the Freundlich model for all three materials. See Table 1 below:

TABLE 1

| Adsorbents | Langmuir model | | | Freundlich model | | |
|---|---|---|---|---|---|---|
| | R$^2$ | K$_L$(L/mg) | Q$_{max}$ (mg/g) | R$^2$ | 1/n | K$_F$ (mg/g · (L/mg)$^{1/n}$) |
| LDH | 0.99 | 0.05 | 625.00 | 0.94 | 0.50 | 54.53 |
| LDH-C8 | 0.99 | 0.37 | 1000.00 | 0.96 | 0.30 | 297.35 |
| LDH-CF | 0.99 | 0.72 | 1333.33 | 0.95 | 0.37 | 503.76 |

According to the Langmuir model, the maximum adsorption capacities of PFOA were 625 mg/g (1.51 mmol/g), 1,000 mg/g (2.42 mmol/g), and 1,333 mg/g (3.22 mmol/g) for the pristine LDH, LDH-C8, and LDH-CF, respectively. Compared to the pristine LDH, LDH-CF and LDH-C8 increased the PFOA adsorption capacities by >110% and ~60%, respectively. Notably, the maximum PFOA adsorption capacity for LDH-CF was higher than the measured anion exchange capacity of LDH-CF (1.57 meq/g) or the loading of the polyfluoroalkyl groups (0.57 mmol/g). Furthermore, the Langmuir constant (i.e., $K_L$) is also an important parameter and reflects the adsorption affinity between adsorbents and adsorbates. Compared to the pristine LDH, the K L values of LDH-C8 and LDH-CF increased by over 7 and 14 folds, respectively.

Figure 7:
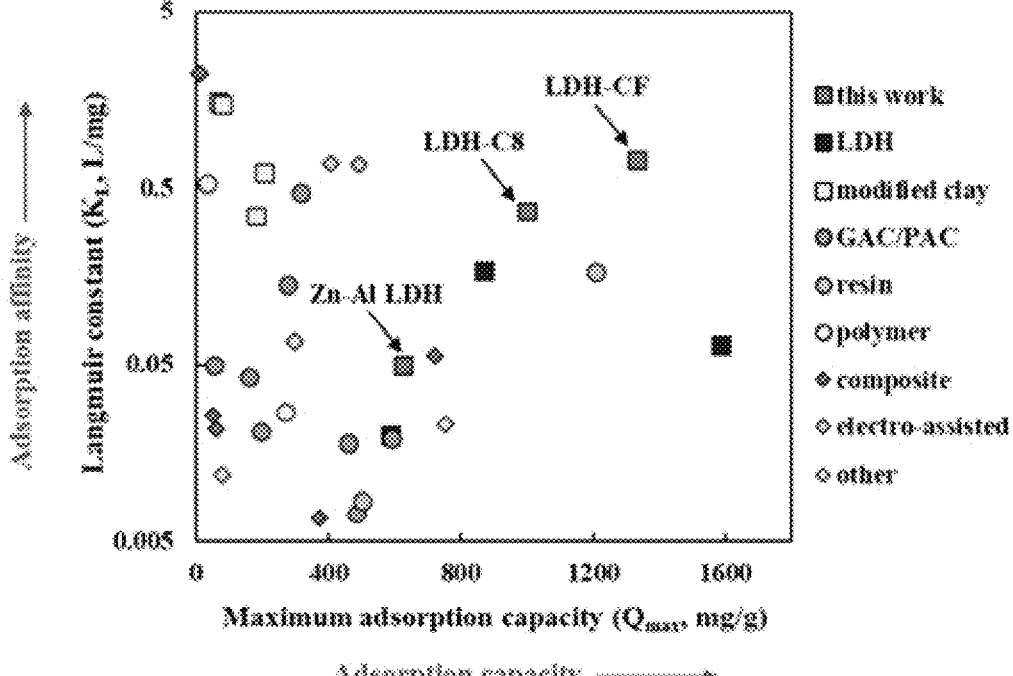
FIG. 7 shows a plot of the Langmuir coefficient versus maximum adsorption capacity for the identified compounds.

Considering both $Q_{max}$ and $K_L$, the performance of the organically functionalized LDHs was compared with a suite of conventional and advanced adsorbents reported in literature. See FIG. 7. The organically functionalized LDHs, particularly LDH-CF, showed both superior adsorption capacity and strong adsorption affinity with PFOA, and outperformed various classes of adsorbents such as unmodified LDHs, PAC/GAC, ion exchange resins, polymeric materials, and organic-inorganic composites. Although a few materials such as calcined hydrotalcite and special ion exchange resin also showed a high PFOA adsorption capacity >1,000 mg/g, their adsorption affinity with PFOA was 4-10 times lower than that of LDH-CF. It is worth noting that the amount of PFOA captured by an adsorbent can be affected by both $Q_{max}$ and $K_L$ under practical conditions. Specifically, the Langmuir model can be simplified as Eq. 3 when the equilibrium concentration of PFOA in the aqueous solution is sufficiently low so that $K_L \cdot C_e \ll 1$:

$$Q_e = Q_{max} K_L C_e \qquad (3)$$

The product of $Q_{max}$ and $K_L$ (i.e., $Q_{max} \cdot K_L$) thus determines the partition of PFOA between adsorbent and aqueous phases at equilibrium, and a higher value of $Q_{max} \cdot K_L$ represents more favorable PFOA adsorption. Based on the calculated $Q_{max} \cdot K_L$ values, organically functionalized LDHs were among the best-performed adsorbents for PFOA removal.

To further investigate the PFOA adsorption mechanisms, FTIR spectra of the unmodified and organically functionalized LDHs after PFOA adsorption were obtained. Compared to the materials prior to PFOA adsorption, a new peak centered ~1650 cm$^{-1}$ related to C=O stretching of the carboxylate group was observed in the organically functionalized LDHs after PFOA adsorption. Meanwhile, although the peak at ~1635 cm$^{-1}$ that represented the bending vibration of adsorbed H$_2$O for the hydrophilic unmodified LDH could be partially overlapped with the C=O stretching peak, this peak shifted slightly to ~1650 cm$^{-1}$ for the PFOA-loaded LDH, which suggested the adsorption of PFOA onto the unmodified LDH. Notably, the observed carboxylate C=O stretching in all PFOA-laden materials was redshifted in comparison to the C=O stretching of pure PFOA reported in literature (centered ~1750 cm$^{-1}$), which may be due to the interactions between the positively charged LDH structural layers and the negatively charged carboxylate group of PFOA. Thus, the FTIR result confirmed that electrostatic interactions were likely present in both the unmodified and organically functionalized LDHs for PFOA adsorption.

It is worth mentioning that compared to LDH-C8, LDH-CF showed stronger adsorption affinity with PFOA (reflected by the higher Langmuir constant $K_L$) and more robust performance under different water chemistry parameters. The enhanced performance of LDH-CF may be attributed to the fluorophilic interactions between the polyfluoroalkyl groups of LDH-CF and C—F chains of PFOA. It has been found that C—F chains had much stronger interactions with C—F chains than C—H chains, because of the unique fluorous chemistry and the more rigid conformational C—F skeletons in comparison to that of the C—H skeletons. Additionally, the unique properties of the polyfluoroalkyl groups of LDH-CF such as oleophobicity may also promote PFOA adsorption through the exclusion of competing anionic substances and NOM. The oleophobic nature of LDH-CF was confirmed based on the large contact angle of n-hexadecane of 110°. The n-hexadecane contact angle on LDH-C8 was close to 0°.

Figure 8:
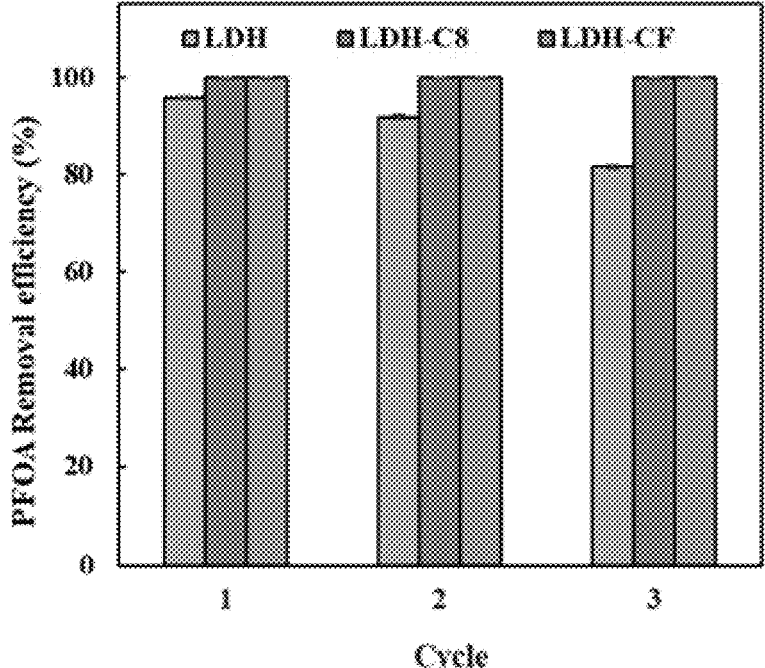
FIG. 8 shows the PFOA removal efficiency for the identified layered double hydroxides subject to regeneration.

The unmodified and organically functionalized LDHs after PFOA adsorption were regenerated using a methanol/water (50%/50%) mixture containing 1 wt % NaCl as the regenerating solution. Nearly complete PFOA desorption was observed for all adsorbents. Reuse of the unmodified and organically functionalized LDHs was then investigated by conducting the adsorption/regeneration experiments for three cycles. LDH-C8 and LDH-CF had consistently better performance than the unmodified LDH, showing nearly complete PFOA removal for all three cycles. See FIG. 8. The performance of the unmodified LDH was reduced over the three cycles.

Figure 9:
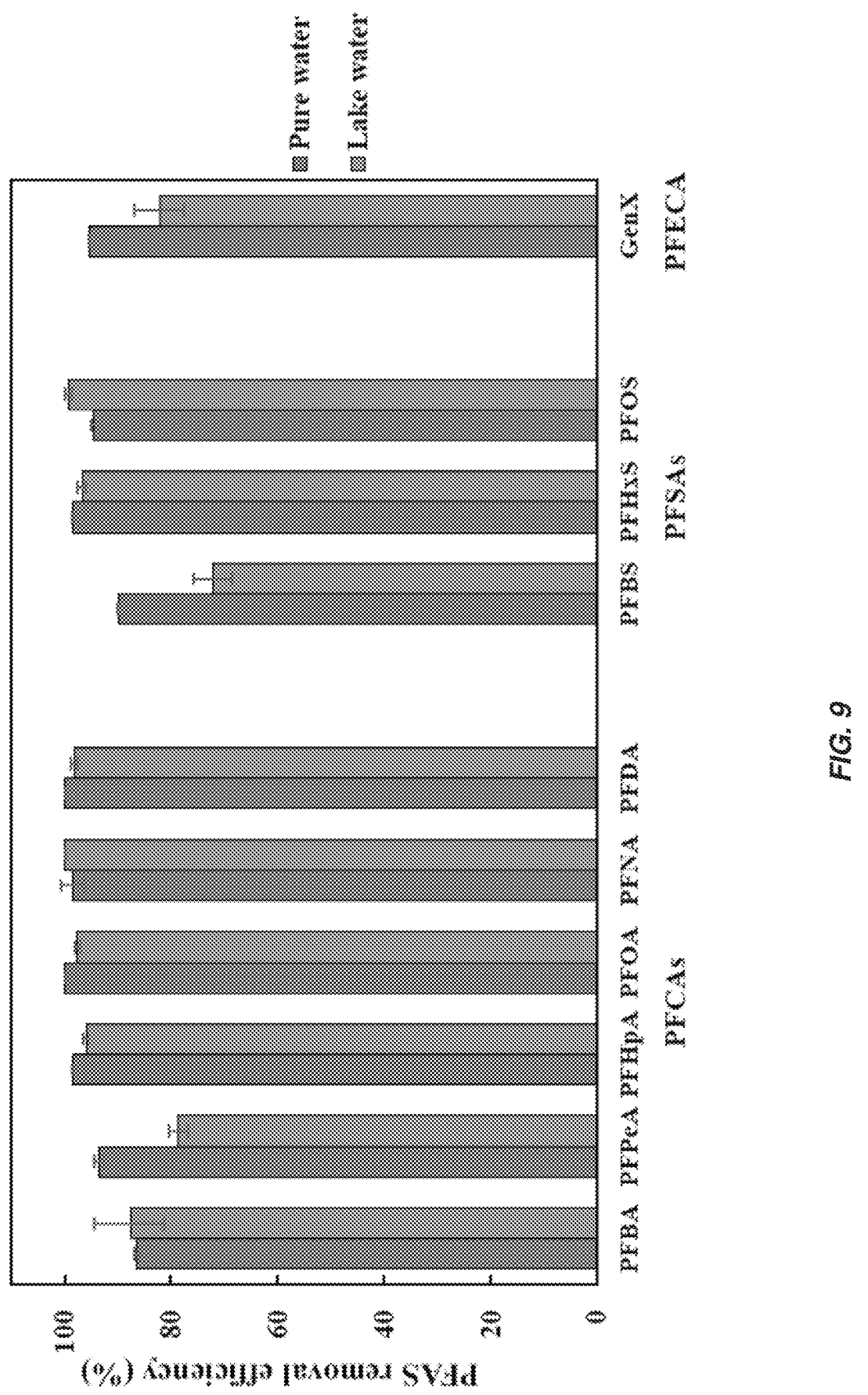
FIG. 9 shows removal efficiency of the identified layered double hydroxides for a mixture of 10 PFAS compounds.

Since LDH-CF exhibited relatively stronger affinity, relatively faster kinetics, and relatively higher capacity for PFOA adsorption than those of LDH-C8 and the unmodified LDH, it was further evaluated for the simultaneous removal of a suite of PFAS compounds under more environmentally relevant concentrations. Specifically, experiments were performed in a mixture of 10 PFAS that included 6 PFCAs, 3 PFSAs, and GenX, each with a nominal concentration of 10 µg/L. See FIG. 9. As shown, >90% removal was achieved for most of the examined PFAS compounds in pure water, suggesting the effectiveness of LDH-CF for the removal of PFAS with varied structures, fluoroalkyl chain lengths, and end functional groups. Even in a natural lake water, LDH-CF showed relatively high removal efficiency of PFBA, PFHpA, PFOA, PFNA, PFDA, PFHxS, and PFOS that were comparable to those in pure water, and the removal efficiency of PFPeA, PFBS, and GenX was only slightly reduced.

Experimental Details

Zinc nitrate hexahydrate (Zn(NO$_3$)$_2$·6H$_2$O, Alfa Aesar), aluminum nitrate nonahydrate (Al(NO$_3$)$_3$·9H$_2$O, EMD-Millipore), acetic acid (C$_2$H$_4$O$_2$, Fisher Scientific), formic acid (CH$_2$O$_2$, Fisher Scientific), ethanol (C$_2$H$_5$OH, VWR-BDH), hydrochloric acid (HCl, VWR-BDH), sodium hydroxide (NaOH, Fisher Scientific), ammonium formate (NH$_4$HCO$_2$, Fisher Scientific), sodium bicarbonate (NaHCO$_3$, Fisher Scientific), sodium chloride (NaCl, Fisher Scientific), sodium nitrate (NaNO$_3$, Fisher Scientific), sodium sulfate decahydrate (Na$_2$SO$_4$·10H$_2$O, Fisher Scientific), n-hexadecane (C$_{16}$H$_{34}$, Fisher Scientific), triethoxy(octyl)silane (C$_{14}$H$_{32}$O$_3$Si, Si—C8, Sigma-Aldrich), and 1H,1H,2H,2H-perfluorooctyltriethoxysilane (C$_{14}$H$_{19}$F$_{13}$O$_3$Si, Si—CF, Oakwood-Chemicals) were used as purchased without further purification. PFOA (Alfa Aesar), perfluorobutanoic acid (PFBA, Sigma-Aldrich), perfluoropentanoic acid (PFPeA, Oakwood Chemical), perfluoroheptanoic acid (PFHpA, Sigma-Aldrich), perfluorononanoic acid (PFNA, Sigma-Aldrich), perfluorodecanoic acid (PFDA, Oakwood Chemical), perfluorobutanesulfonic acid (PFBS, Sigma-Aldrich), perfluorohexanesulfonic acid (PFHxS) in potassium salt (Sigma-Aldrich), PFOS in potassium salt (Sigma-Aldrich), and 2,3,3,3-tetrafluoro-2-(1,1,2,2,3,3,3-heptafluoropropoxy)propanoic acid (HFPO-DA or GenX, Wellington Laboratories) were used as representative PFAS. Ultrapure water (resistivity>18.2 MΩ cm) was used to prepare solutions. A natural lake water sample was collected from Lake Michigan. The water was filtered with a 0.22-μm polyethersulfone (PES) membrane (Millipore) before experimental use.

Zn—Al LDH was synthesized following a standard aqueous co-precipitation method. Briefly, a 50-mL mixed solution of 0.75-M $Zn(NO_3)_2 \cdot 6H_2O$ and 0.25-M $Al(NO_3)_3 \cdot 9H_2O$ was prepared ($Zn^{2+}/Al^{3+}$ molar ratio=3:1) and added into 50 mL of a 2-M NaOH solution under vigorous stirring in a dropwise manner. Once the reaction was completed, the white slurry was aged for 24 h at room temperature, followed by centrifugation to collect the solids. The solids were washed with water several times, dried in an oven at 60° C., and preserved for future use.

Organically functionalized Zn—Al LDHs were prepared through post-grafting of an organosilane onto the Zn—Al LDH. Specifically, Zn—Al LDH was modified with two organic functional groups, including an alkyl chain group (C8) and a polyfluoroalkyl group (CF), with the use of the corresponding organosilanes (Si—C8 and Si—CF). Briefly, the alkyl-modified LDH (i.e., denoted as LDH-CH) was prepared by dispersing ~12.5 mmol of Zn—Al LDH in 60 mL of ethanol. Then, a desired amount of the organosilane (molar ratio of Si—C8/LDH=1:1) was added dropwise into the suspension under stirring, followed by adding 2 mL acetic acid. After 24 h of reaction, the solids were collected via centrifugation, and washed with ethanol and water 3 times, respectively. The obtained solids were dried in an oven at 60° C. and preserved for future use. The polyfluoroalkyl-modified LDH (i.e., denoted as LDH-CF) was prepared following the same method with the use of Si—CF as the organosilane and a smaller Si—CF/LDH molar ratio of 0.2 because of the strong hydrophobicity of Si—CF.

The structure of the raw and organically modified LDHs was characterized using powder X-ray diffraction (XRD) with a Bruker D8 Discover A25 diffractometer with copper Kα radiation. The scan speed and step size were 6° per min and 0.02°, respectively. Scanning electron microscopy (SEM) imaging was performed to determine the morphology of the materials using a Hitachi Model S4800. Fourier-transform infrared spectroscopy (FTIR) measurements were acquired on a Shimadzu IRTracer100 Spectrometer to investigate the surface functional groups of the materials. The vibrations corresponding to the wavenumbers in the range of 600-4000 $cm^{-1}$ were collected with a resolution of 4 $cm^{-1}$. The thermo-gravimetric analysis (TGA) was conducted on a Discovery SDT 650 thermo-gravimeter (TA Instruments) in a 50-mL/min air flow with a temperature ranging from 30 to 800° C. and a heating rate of 10° C./min. Contact angle measurements of water and n-hexadecane were performed using a Ramé-Hart goniometer. X-ray photoelectron spectroscopy (XPS) measurement was performed on a Perkin Elemer PHI 5440 ESCA system with an Al Kα X-ray source. Zeta potentials of the materials prior to and after PFOA adsorption were measured with a Malvern Zetasizer Nano ZS 90 at pH 3-11. Carbon contents of the materials were measured on a Fisons NA 1500 NCS elemental analyzer to determine the organic functional group loadings.

PFOA adsorption experiments were performed under batch mode in polypropylene reactors placed on an orbital shaker (Thermo Scientific, 300 rpm) at room temperature (22±2° C.). Experiments were conducted at an initial pH of 6 with an adsorbent loading of 1 g/L and a PFOA concentration of 500 μg/L, unless otherwise specified. The solution pH was not buffered, and the final pH was stable at 7.0±0.5 at the end of the experiments. Experiments were performed for 48 h to ensure that adsorption achieved equilibrium, except for the kinetics experiments where samples were collected at various time intervals (i.e., 2 min-48 h). To determine the maximum adsorption capacity, adsorption isotherm experiments were conducted with a series of PFOA concentrations up to 350 mg/L with a reduced adsorbent loading of 0.25 g/L because of the large adsorption capacity for the organically functionalized LDHs. In addition, a set of experiments were performed to evaluate the effect of common water chemistry parameters on PFOA adsorption, including solution pH (3-9), ionic strength (provided by NaCl, 1-100 mM), coexisting anions (chloride, sulfate, carbonates, nitrate, 1 mM), and NOM (Suwannee River NOM, 1 mM as C). Furthermore, the performance of LDH-CF was evaluated for the removal of multiple PFAS under more environmentally relevant concentrations in both a simple lab-prepared solution (i.e., ultrapure water) and a natural lake water. Specifically, experiments were conducted with waters amended with a mixture of 10 PFAS that included 6 perfluorinated carboxylic acids (PFBA, PFPeA, PFHpA, PFOA, PFNA, PFDA), 3 perfluorinated sulfonic acids (PFBS, PFHxS, PFOS), and GenX, each with a nominal concentration of 10 μg/L. All experimental conditions were run in at least duplicates.

Reuse of the raw and organically functionalized LDHs was determined by conducting PFOA adsorption/regeneration experiments for 3 cycles. In each cycle, adsorption experiments were first conducted at pH 6 with an adsorbent loading of 1 g/L and a PFOA concentration of 500 μg/L for 48 h. The PFOA-loaded adsorbents were then collected through centrifugation and regenerated in a freshly prepared methanol/water (50%/50%) mixture containing 1 wt % NaCl for 24 h. The regenerated adsorbents were collected through centrifugation, washed with water for 3 times, and reused in the next cycle.

In all experiments, the collected samples were immediately filtered with 0.22-μm PES syringe filters (SLGPX13NK, Millipore), and the filtrates were preserved for PFAS analysis. No significant PFAS loss was observed during the filtering process because of the small filter diameter (i.e., 13 mm) and the use of a pre-rinsing step (i.e., the first 3-mL sample was used to rinse the filter and wasted). The PFOA concentrations in the aqueous samples from the single-solute experiments were determined using a high-performance liquid chromatography (HPLC, UltiMate 3000, Thermo Scientific) couple with single quadrupole mass spectrometry (ISQ EM, Thermo Scientific). This method had a PFOA detection limit of 2 μg/L. The concentrations of the 10 PFAS mixture from the mixed-solute experiments were determined using an ultra-high-performance liquid chromatography (UHPLC) system coupled with a triple quadrupole mass spectrometry (LCMS-8040, Shimadzu).

The PFAS adsorption amount and removal efficiency were calculated using Eqs. 4 and 5, respectively:

$$q_e = \frac{(c_0 - c_e) * V}{m} \tag{4}$$

-continued $$Removal\ (\%) = \left(1 - \frac{C_e}{C_0}\right) \times 100\% \qquad (5)$$

where $q_e$ (mg/g) is the amount of PFAS adsorbed onto the adsorbent at equilibrium, $C_0$ (mg/L) and $C_e$ (mg/L) represent the initial PFAS concentration and the equilibrium PFAS concentration in solution, respectively, and m (g) and V (L) are the adsorbent mass and the PFAS solution volume, respectively.

As can therefore now be appreciated from the above, compared to the unmodified LDH, modification with organic functional groups provided useful hydrophobic interactions that were synergistic with the electrostatic interactions of the LDH structural layers, resulting in the substantially improved performance for PFOA adsorption in terms of adsorption kinetics, capacity, and affinity. LDH-CF identified the relatively beneficial role of polyfluoroalkyl groups for PFOA adsorption. LDH-CF showed relatively fast PFOA adsorption kinetics with equilibrium achieved within 5 min, had a high PFOA adsorption capacity >1,300 mg/g, and exhibited robust performance that resulted in nearly complete PFOA removal in the presence of various anionic substances, NOM, and a range of ionic strengths. Furthermore, LDH-CF can be readily regenerated and reused, and was efficient for the simultaneous removal of numerous PFAS with different structures.

The invention claimed is:

1. A functionalized layered double hydroxide having the following formula:

$$3[M^{2+}_{1-x}N^{3+}_x(OH)(A^{n-})_{x/n}\text{-}O]\text{---}Si(CH_2)_a\text{---}(CF_2)_bR'$$

wherein $M^{2+}$ and $N^{3+}$ are metal cations;
$A^{n-}$ is an exchangeable anion, n is an integer of 1 or greater;
$0<x<1$;
R' represents an aromatic, $CH_2\text{==}CH\text{---}$, $\text{---}CH_3$ or $\text{---}CF_3$ group;
if b=0, then a≥5; and
if b>0, then a≥0.

2. The functionalized layered double hydroxide of claim 1 wherein $M^{2+}$ is selected from the group consisting of $Mg^{2+}$, $Ca^{2+}$, $Zn^{2+}$, $Mn^{2+}$, and $Fe^{2+}$.

3. The functionalized layered double hydroxide of claim 1 wherein $N^{3+}$ is selected from the group consisting of $Al^{3+}$ and $Fe^{3+}$.

4. The functionalized layered double hydroxide of claim 1 wherein $A^{n-}$ is selected from the group consisting of $NO_3^-$ and $Cl^-$.

5. The functionalized layered double hydroxide of claim 1 wherein when b=0 then a=5-19.

6. The functionalized layered double hydroxide of claim 1 wherein when b=1-11, a=0-15.

7. The functionalized layered double hydroxide of claim 1 wherein M=Zn, N=Al, A is $NO_3^-$, a=7 and R' is $\text{---}CH_3$.

8. The functionalized layered double hydroxide of claim 1 wherein M=Zn, N=Al, A is $NO_3^-$, a=2, b=5 and R' is $\text{---}CF_3$.

9. A method of preparation of a functionalized layered double hydroxide comprising:
a. supplying an organofunctional silicon having the following formula:

$$R'(CF_2)_b(CH_2)_aSi(OR)_3$$

wherein R' represents an aromatic, $CH_2\text{==}CH\text{---}$, $\text{---}CH_3$ or $\text{---}CF_3$ group and (OR) represents an alkoxy group; if b=0, then a≥5 or if b>0 then a≥0;

b. supplying a layered double hydroxide having the following formula:

$$[M^{2+}_{1-x}N^{3+}_x(OH_2)]^{x+}(A^{n-})_{x/n}$$

wherein $M^{2+}$ and $N^{3+}$ are metal cations and $A^{n-}$ is an exchangeable anion, n is an integer of 1 or greater, $0<x<1$;
c. combining said organofunctional silicon with said layered double hydroxide and forming a functionalized layered double hydroxide having the following formula:

$$3[M^{2+}_{1-x}N^{3+}_x(OH)(A^{n-})_{x/n}\text{-}O]\text{---}Si(CH_2)_n\text{---}(CF_2)_bR'$$

wherein $M^{2+}$ and $N^{3+}$ are the metal cations;
$A^{n-}$ is the exchangeable anion, n is the integer of 1 or greater;
$0<x<1$;
R' represents the aromatic, $CH_2\text{==}CH\text{---}$, $\text{---}CH_3$ or $\text{---}CF_3$ group;
if b=0, then a≥5; and
if b>0, then a≥0.

10. The method of claim 9 wherein $M^{2+}$ is selected from the group consisting of $Mg^{2+}$, $Ca^{2+}$, $Zn^{2+}$, $Mn^{2+}$, and $Fe^{2+}$.

11. The method of claim 9 wherein $N^{3+}$ is selected from the group consisting of $Al^{3+}$ and $Fe^{3+}$.

12. The method of claim 9 wherein $A^{n-}$ is selected from the group consisting of $NO_3^-$ and $Cl^-$.

13. The method of claim 9 wherein when b=0 then a=5-19.

14. The method of claim 9 wherein when b=1-11, a=0-15.

15. The method of claim 9 wherein M=Zn, N=Al, A is $NO_3^-$, a=7 and R' is $\text{---}CH_3$.

16. The method of claim 9 wherein M=Zn, N=Al, A is $NO_3^-$, a=2, b=5 and R' is $\text{---}CF_3$.

17. A method of removing per- and polyfluoroalkyl substances from contaminated water comprising:
a. supplying a functionalized layered double hydroxide having the following formula:

$$3[M^{2+}_{1-x}N^{3+}_x(OH)(A^{n-})_{x/n}\text{-}O]\text{---}Si(CH_2)_n\text{---}(CF_2)_bR'$$

wherein $M^{2+}$ and $N^{3+}$ are metal cations;
$A^{n-}$ is an exchangeable anion, n is an integer of 1 or greater;
$0<x<1$;
R' represents an aromatic, $CH_2\text{==}CH\text{---}$, $\text{---}CH_3$ or $\text{---}CF_3$ group;
if b=0, then a≥5;
if b>0, then a≥0;
b. treating said contaminated water with said functionalized layered double hydroxide and removing said per- and polyfluoroalkyl substances.

18. The method of claim 17 wherein $M^{2+}$ is selected from the group consisting of $Mg^{2+}$, $Ca^{2+}$, $Zn^{2+}$, $Mn^{2+}$, and $Fe^{2+}$.

19. The method of claim 17 wherein $N^{3+}$ is selected from the group consisting of $Al^{3+}$ and $Fe^{3+}$.

20. The method of claim 17 wherein $A^{n-}$ is selected from the group consisting of $NO_3^-$ and $Cl^-$.

21. The method of claim 17 wherein when b=0 then a=5-19.

22. The method of claim 17 wherein when b=1-11, a=0-15.

23. The method of claim 17 wherein M=Zn, N=Al, A is $NO_3^-$, a=7 and R' is $\text{---}CH_3$.

24. The method of claim 19 wherein M=Zn, N=Al, A is $NO_3^-$, a=2, b=5 and R' is $\text{---}CF_3$.

* * * * *